United States Patent
Conquergood

(10) Patent No.: US 7,562,584 B2
(45) Date of Patent: Jul. 21, 2009

(54) SYSTEM, METHOD AND APPARATUS FOR ACOUSTIC FLUID FLOW MEASUREMENT

(75) Inventor: Steve Conquergood, Calgary (CA)

(73) Assignee: Advanced Flow Technologies Inc., Calgary (CA)

( * ) Notice: Subject to any disclaimer, the term of this patent is extended or adjusted under 35 U.S.C. 154(b) by 402 days.

(21) Appl. No.: 11/308,567

(22) Filed: Apr. 7, 2006

(65) Prior Publication Data
US 2006/0225514 A1 Oct. 12, 2006

(30) Foreign Application Priority Data
Apr. 7, 2005 (CA) .................................. 2503275

(51) Int. Cl.
*G01F 1/00* (2006.01)
(52) U.S. Cl. .................. 73/861; 73/861.18; 73/861.25; 73/861.26
(58) Field of Classification Search ............... 73/587, 73/861, 861.18, 861.25, 861.26
See application file for complete search history.

(56) References Cited

U.S. PATENT DOCUMENTS

| | | | |
|---|---|---|---|
| 3,580,092 | A | 5/1971 | Scarpa |
| 3,958,458 | A | 5/1976 | Foreman |
| 4,932,262 | A | 6/1990 | Wlodarczyk |
| 5,022,266 | A | 6/1991 | Cody |
| 5,148,405 | A | 9/1992 | Belchamber |
| 5,353,627 | A | 10/1994 | Diatschenko |
| 5,415,048 | A | 5/1995 | Diatschenko |
| 5,419,197 | A | 5/1995 | Ogi |
| 5,549,000 | A | 8/1996 | Brown |
| 5,551,297 | A | 9/1996 | Miura |
| 5,675,071 | A | 10/1997 | Cody |
| 5,741,980 | A | 4/1998 | Hill |
| 5,959,217 | A * | 9/1999 | De Bree et al. .......... 73/861.25 |
| 6,354,147 | B1 | 3/2002 | Gysling |
| 6,412,352 | B1 | 7/2002 | Evans |
| 6,553,844 | B2 * | 4/2003 | Drzewiecki .............. 73/861.19 |

(Continued)

FOREIGN PATENT DOCUMENTS

CA 1305247 6/1989

(Continued)

OTHER PUBLICATIONS www.clampon.com "Clampon DSP Particle Monitor" PDF Brochure, Jan. 16, 2005(date the document was printed).

*Primary Examiner*—Hezron Williams
*Assistant Examiner*—Samir M Shah
(74) *Attorney, Agent, or Firm*—Sean W. Goodwin

(57) ABSTRACT

An apparatus, system and methodology enable non-intrusive measurement of parameters related to fluid flow in a conduit. An acoustic sensor is located along the conduit and includes a mechanical amplifier having an acoustic input coupled to the conduit and a microphone coupled to the mechanical amplifier. The microphone receives mechanically amplified acoustic energy from the conduit and establishing first signals which are processed for generating second signals which are related to fluid flow in the conduit. The second signals can include quantitative flow data and qualitative data such as change in state and alarms. The second signals can be transmitted wirelessly to a remote site for further processing. Use of low power components and power management enable long term operations on battery power.

17 Claims, 9 Drawing Sheets

U.S. PATENT DOCUMENTS

| | | |
|---|---|---|
| 6,601,458 B1 | 8/2003 | Gysling |
| 6,672,131 B1 | 1/2004 | Aldal |
| 6,732,575 B2 | 5/2004 | Gysling |
| 6,813,962 B2 | 11/2004 | Gysling |
| 6,837,098 B2 | 1/2005 | Gysling |
| 7,055,389 B2 * | 6/2006 | Mueller .................. 73/620 |
| 7,234,353 B2 * | 6/2007 | Mueller .................. 73/618 |
| 2003/0192382 A1 * | 10/2003 | Mueller .................. 73/620 |
| 2005/0173354 A1 * | 8/2005 | Binot et al. ............. 210/788 |
| 2006/0225514 A1 * | 10/2006 | Conquergood ............. 73/861 |

FOREIGN PATENT DOCUMENTS

| | | |
|---|---|---|
| CA | 2045716 | 12/1991 |
| CA | 2192488 | 6/1997 |
| CA | 2335457 | 1/2000 |
| CA | 2010452 | 4/2000 |
| CA | 2428301 | 6/2002 |
| WO | WO00/45161 | 8/2000 |
| WO | WO02/46706 | 6/2002 |
| WO | WO2004/079306 | 9/2004 |

* cited by examiner

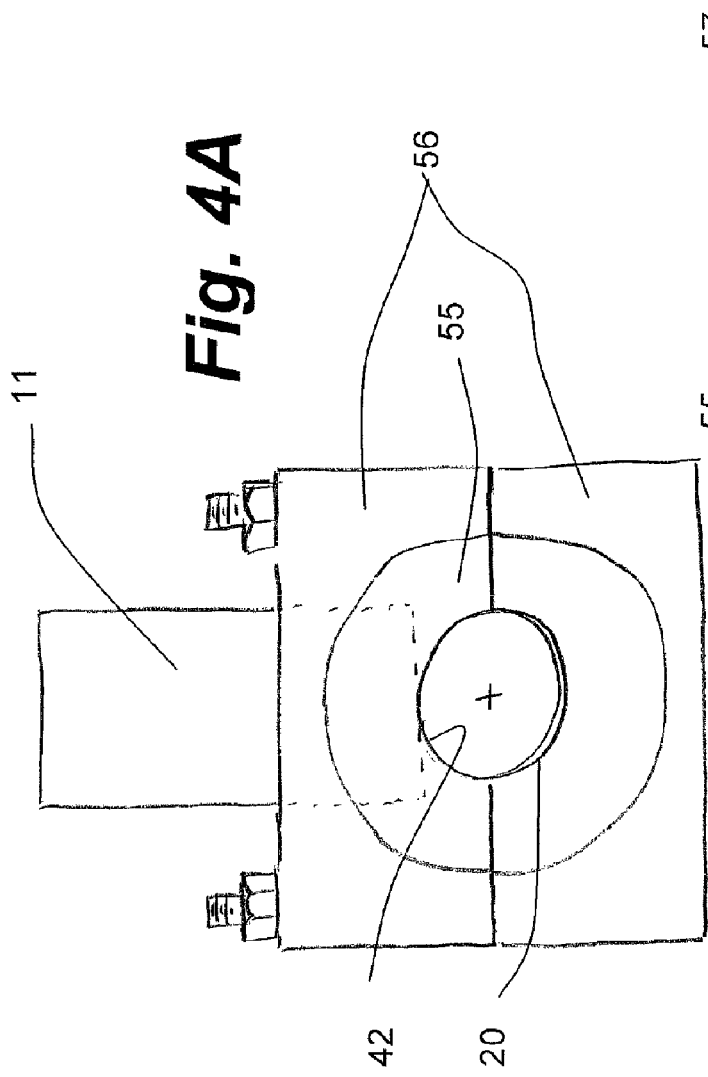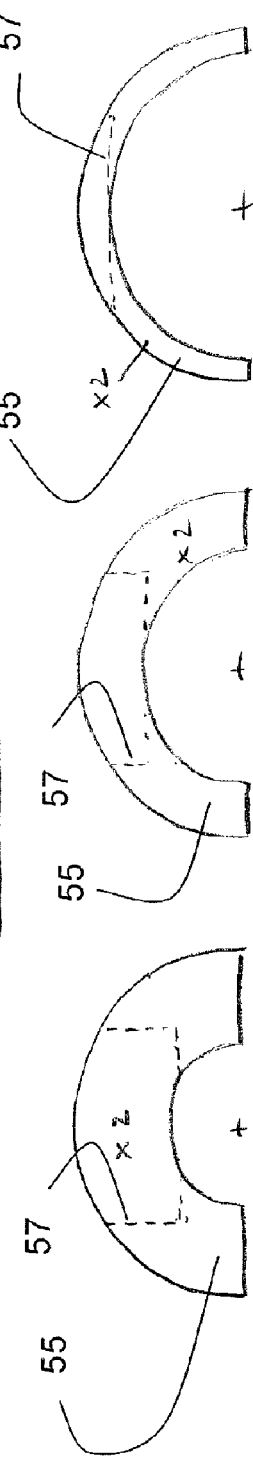

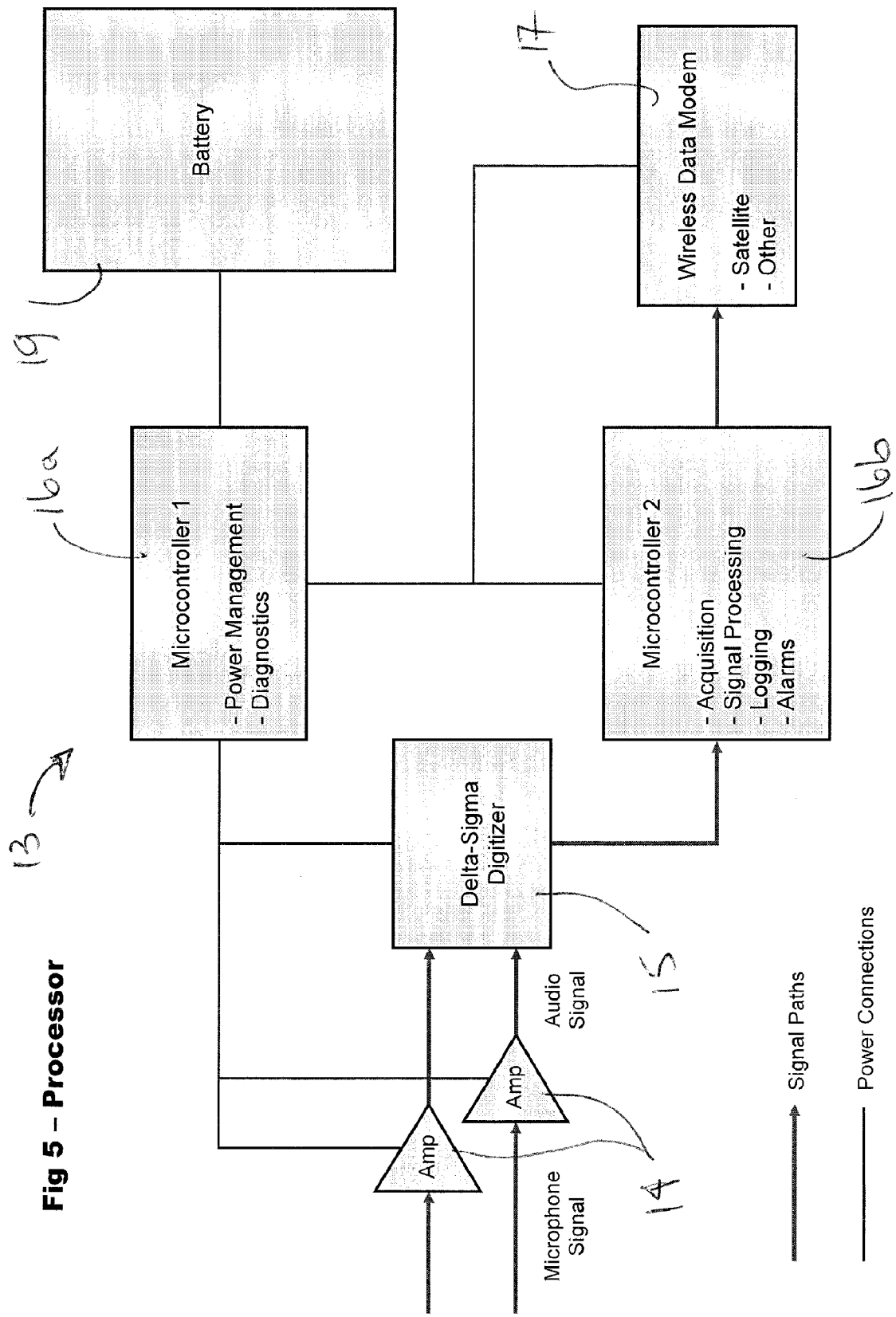
Fig 5 – Processor

SYSTEM, METHOD AND APPARATUS FOR ACOUSTIC FLUID FLOW MEASUREMENT

FIELD OF THE INVENTION

This invention relates to apparatus, systems and methodology for measuring acoustic characteristics of flow in a conduit for establishing rate of fluid flow therethrough. More particularly, battery powered, low power consumption components are combined for the acoustic measurement of flow including a mechanical amplifier, a microphone and on-site processing of acoustic flow data which can be transmitted off-site.

BACKGROUND OF THE INVENTION

Invasive flow measurement devices, such as orifice plates affect the flow itself. Measurement without orifice plate, or other restrictions applied for direct flow measurement, is particularly important in very low pressure systems where even the 1 to 5 psi pressure drop across an orifice cannot be tolerated. Such parameters are increasingly common in the flow produced from shallow gas wells and coal bed methane fields.

Flow measurement using non-invasive acoustic characteristics of the fluid flowing therethrough are known. Active systems are known whereby ultrasonic frequency and the like are transmitted into the system and acoustic responses received which are analyzed for flow including U.S. Pat. No. 6,672,131 to Aldal et al. Others implement a combination of non-invasive vibrational response and flow coupled pressure measurement to ascertain flow such as U.S. Pat. No. 5,415,048 to Diatschenko. The systems are characterized by instrumentation and processing components which are high power consumers, conventional in that they typically require connection to existing utility services.

Other considerations are that sensors are unreliable in their repeatability due to methods and apparatus for mounting. Conventional microphones require electronic amplification which introduces signal to noise considerations and require non-trivial power sources unsuitable for remote locations isolated from utilities. Conventional data collection requires significant power and transmission of raw data requires large bandwidth and sophisticated communications.

There is a demonstrated need for flow measurement capabilities such as in remote, un-serviced locations.

SUMMARY OF THE INVENTION

In one embodiment of the invention, a non-invasive, intrinsically safe fluid flow measurement system and method comprises mechanical amplification of acoustic characteristics with on-site digitization, signal processing to establish values indicative of flow rate and qualitative data such as event data and equipment status. Apparatus employs minimum power consumption components suitable for powering using a battery source over extended operational periods. Such apparatus can comprise a low power microphone, analog amplifiers, digitizers, microprocessors, transceivers and implement power management techniques.

In one broad aspect of the invention, an acoustic sensor is provided for non-intrusive measurements of acoustic energy at a surface comprising: an acoustic coupler adapted for consistent contact with the surface; a mechanical amplifier having an acoustic input coupled to the acoustic coupler and having an acoustic output; and a microphone coupled to the acoustic output and establishing first signals related to acoustic energy.

In application, the sensor is applied in a system for the measurement of parameters related to fluid flow in a conduit comprising: the acoustic sensor located along the conduit and having the acoustic coupler adapted for contact with the conduit wherein the first signals are related to acoustic energy in the conduit; and a signal processor for receiving the first signals and generating second signals or data related to fluid flow in the conduit.

The apparatus and system enable practicing of a non-intrusive method of measuring fluid flow in a conduit comprising: providing an acoustic sensor, the sensor comprising a mechanical amplifier having an acoustic input coupled to the conduit and a microphone coupled to the mechanical amplifier; locating the acoustic sensor along the conduit; receiving mechanically amplified acoustic energy from the conduit at the microphone and establishing first signals related to the acoustic energy from the conduit; and processing the first signals for generating second signals which are related to fluid flow in the conduit.

In one embodiment, a mechanical amplifier is retained in surface contact with a metallic conduit using a rare earth magnet. The mechanically amplified sound waves from fluid flowing in the conduit are received at a low power, condenser-type microphone. The power requirements of the microphone are minimal and can be determined to be at intrinsically safe levels. These first microphone signals are conducted outside of the intrinsically safe area to a radio frequency (RF) amplifier. While not the most accurate for audio frequencies, an RF amplifier is a lower power option for increasing the signal strength and delivering the raw amplified audio signal to a digitizer. This second digitized signal is received by a signal processor such as for the elimination of non-flow data (noise) and the remaining signal is related to a fluid flow rate. On-site processing can be managed by a microprocessor for periodic measurement and processing to conserve battery-power, particularly useful for remote un-serviced locations. A low power satellite transmitter can communicate a compact data packet of processed data for analysis at another location.

Use of such components results in very low power consumption so that stand-alone, battery-operated operation at remote sites is possible. This is accomplished through the selection of very low power devices, and a microprocessor which specifically controls power to all other devices.

Data from each measurement location is transmitted by satellite, radio, or other wireless device to a central computer, which stores the readings in a database. Reports can be generated for users which report on the level of flow at individual sites, accumulated field zones, and regional areas. Changes in flow are reported immediately via alarm messages using communication means including email, cell phones, pagers, the Internet.

BRIEF DESCRIPTION OF THE DRAWINGS

FIG. 4 is side view of an embodiment of an acoustic sensor protective housing having a fixed size outer shell and variable size inserts to adapt to varying pipe sizes;

FIG. 5 is a schematic of the control circuit;

DETAILED DESCRIPTION OF THE PREFERRED EMBODIMENT

Various physical processes result in the generation of acoustic energy. Measurement of the acoustic energy can reveal characteristics about the generating process. One such process is the flow of fluids.

Figures 1A, 1B:
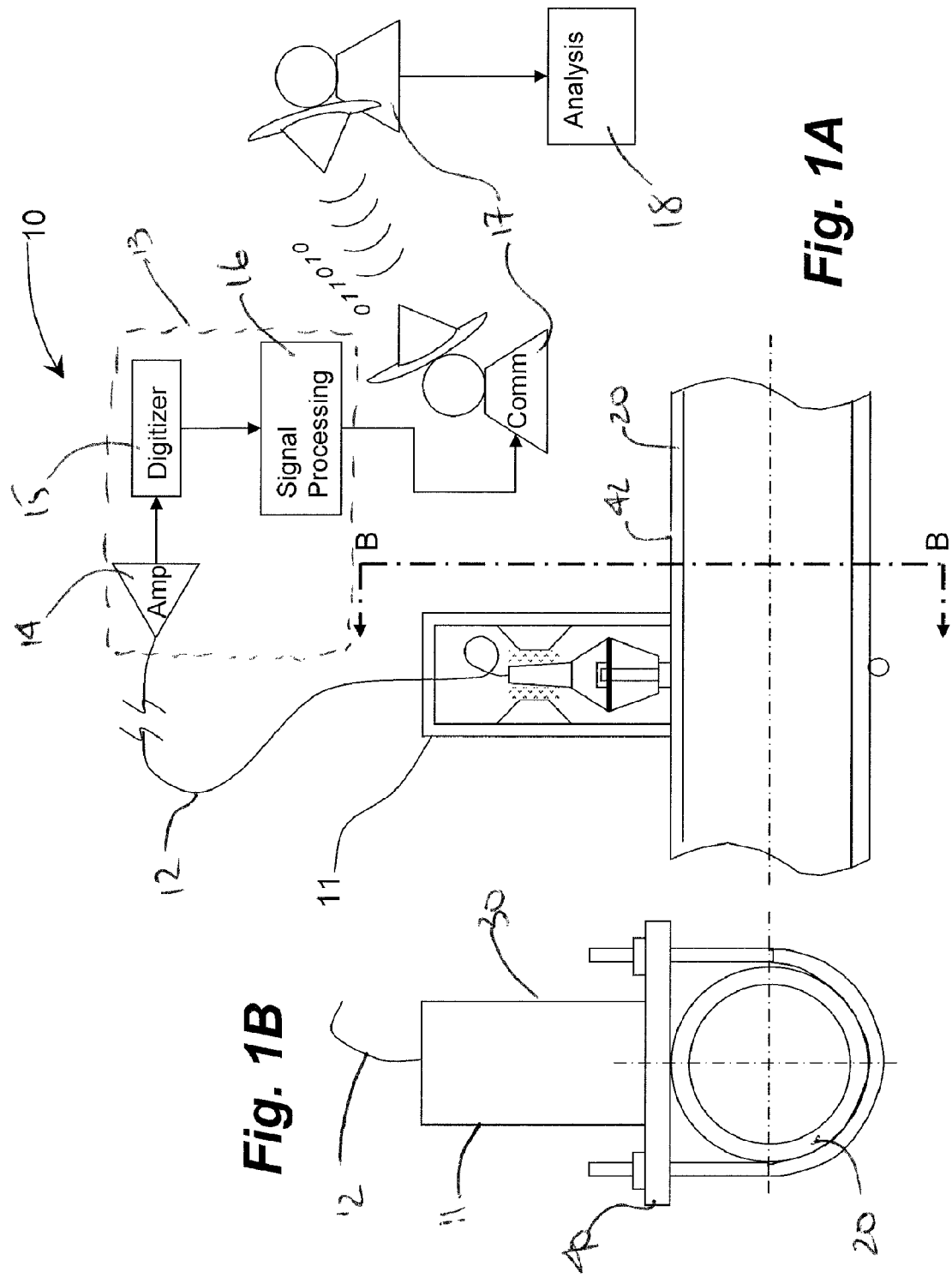
FIG. 1A is a schematic of a conduit fit with an acoustic sensor, amplifier, digitizer, signal processing and communication means to a central computer with further processing capability.
FIG. 1B is a cross-sectional view of the conduit and view of the system of FIG. 1A along lines B-B.

As shown in FIGS. 1A and 1B, a pipe or conduit 20 conducts fluid therein. The flow of fluid is associated with the generation of acoustic energy. Typically the fluid of interest is gas, though Applicant expects that other fluids are equally applicable.

In one embodiment of the invention, apparatus is provided for measuring the acoustic energy associated with the flow of fluid. A non-invasive, acoustic sensing means or sensor 11 is placed in contact with an external surface of the conduit 20 for detecting sound or the acoustic energy of flowing fluid therein and for generating first signals including information representative of at least the flow rate therethrough. The acoustic sensor 11 is passive, that is, that the sound detected is from the fluid flow and is neither generated nor responsive to excitation sound from an independent source. In many instances of interest, the acoustic energy is low enough that a simple microphone alone would not generate a signal distinguishable from noise and thus amplification is employed.

The sensor 11 is part of an acoustic flow measurement system 10 comprising an embodiment of acoustic sensor 11 of the present invention and a signal management system 13 for processing the first signals from the sensor 11 and generating second signals which are at least indicative of flow rate. Herein, the term "signals" is deemed to represent both analog and digital signals. Physically, the signal management system may be partly located with the sensor 11 or can be standalone. In the case of a digital microphone at the sensor 11, the first signals are digital and would have already been subject to some processing such as amplification before analog to digital conversion. As shown, such as in the case of an analog microphone, the first signals from the sensor 11 are analog electrical signals which are delivered by cable or wires 12 to a control circuit 13 which typically includes signal amplification and digitization.

As necessary, control circuit 13 includes a signal amplifier 14 and a digitizer for receiving and digitizing said first signals and generating a raw data stream of second digital signals. The control circuit further comprises a signal processor 16 for performing at least some on-site digital signal processing of the raw data stream. A processed data set can be transmitted to a remote site for analysis. Preferably the transmission of the data set is wireless via satellite communications 17 to a remote location 18 for detailed data analysis. A battery 19 provides power for the system.

Sensor

Figure 2:
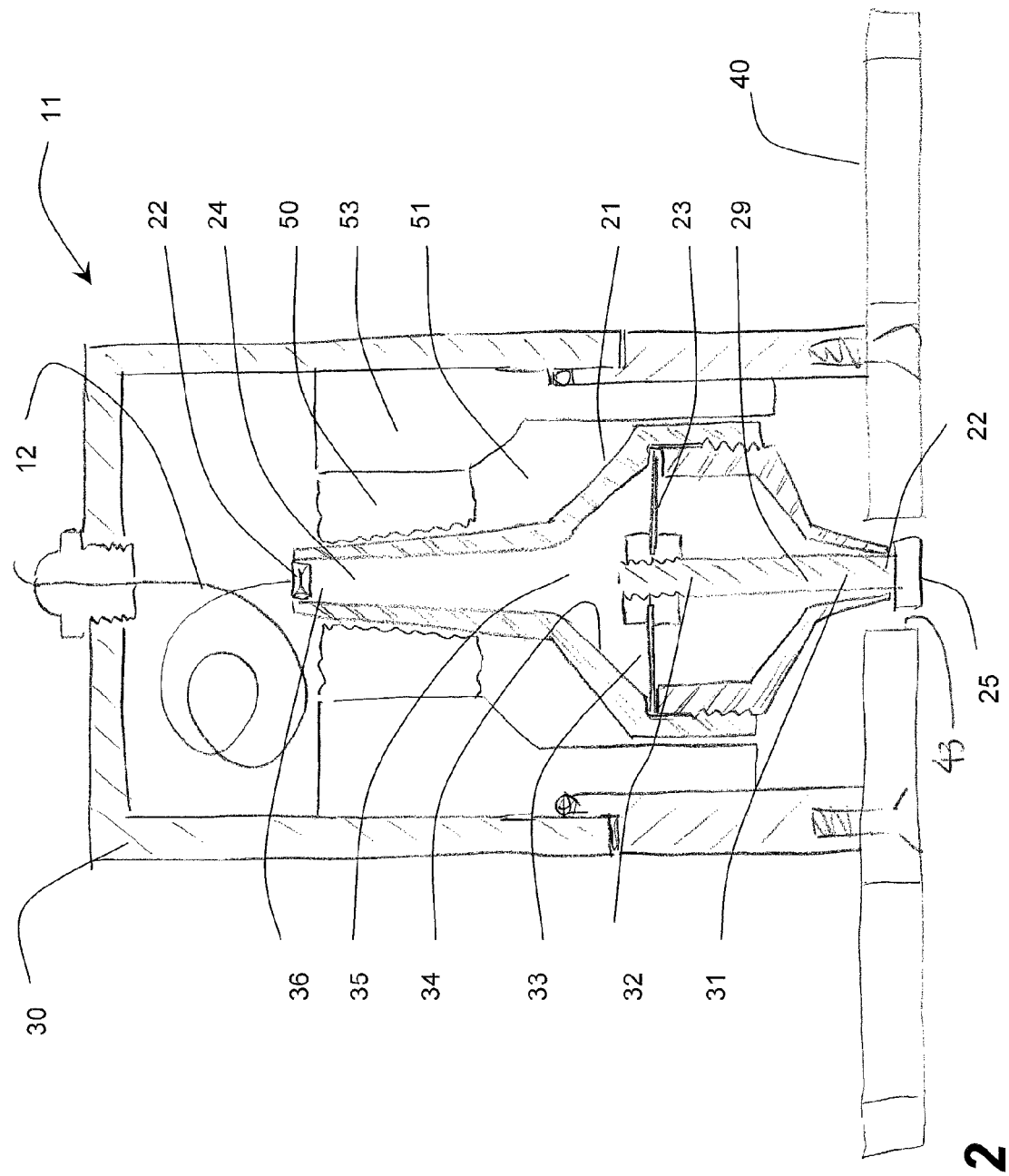
FIG. 2 is a cross sectional view of an acoustic sensor according to one embodiment of the invention.

With reference to FIG. 2, the acoustic sensor 11 comprises a mechanical amplifier 21 acoustically coupled to the conduit 20 and a microphone 22 receiving the mechanically amplified sounds. The mechanical amplifier 21 comprises an acoustic input 22, an acoustic amplifier 23 and an amplified acoustic output 24. The sensor 11 can be located along the conduit 20 and for sensing enhanced levels of acoustic energy levels, the sensing means 11 can be located adjacent a disturbance in the flow, such as an orifice plate or elbow. The mechanical amplifier 21 is housed in an outer housing 30 which is mounted to or adjacent the conduit for positioning the sensor 11 in contact with the conduit. The outer housing also protects the sensor 11 from the environment.

In one embodiment, the mechanical amplifier is acoustically coupled to a surface at its acoustic input 22, such as to the surface 42 of the conduit 20, through a surface coupling 25. The surface coupling 25 provides a consistent coupling for maintaining an acoustic connection between the surface 42 wall of the conduit 20 and the acoustic input.

The mechanical amplifier 21 is free to move independently of the outer housing 30 to avoid interfering with the consistent coupling contact of the surface coupler 25. This is a significant improvement over the mounting of prior art sensors, such as simple mechanical clamping of the prior art sensor itself, which can produce wide variations in readings.

For example, consistent coupling can be achieved using means including adhering the coupler to the surface such as through adhesive or magnetic attraction, or positive biasing of the coupler against the surface. The coupling need only meet the demands of the acoustic environment. The acoustic coupler need only adhere sufficiently to remain coupled to the surface in operation. Different acoustic properties could require more or less adherence or forceful coupling. A suitable strength of mutual magnetic attraction would retain the acoustic coupler 25 in contact with the surface 42. Similarly, in a biasing approach, a spring could be used which produces a relatively constant force, such as through a soft spring having a long stroke length to accommodate mounting differences. Another approach is to preload the diaphragm, or use a bladder or gas strut. Overly aggressive coupling could attenuate the transmission of acoustic energy to the acoustic input.

In one embodiment, and for surfaces such as a conduits manufactured of magnetically attractable materials such as steel piping, the surface coupling 25 is provided by a strong magnet such as a rare earth magnetic 41 mounted at the end of the rod 29, providing a robust and constant force coupling to the conduit 20. The magnet 41 provides constant attractive force to the conduit wall 42, so that acoustic energy results are reproducible from sensor to sensor 11,11 . . . and from conduit to conduit 20,20 . . . . As stated, the mechanical amplifier 21 is movable within the housing 30 which is secured at the location along the conduit.

The acoustic input 22 can comprise a rigid rod 29 having a first end 31 for acoustically coupling with the conduit 20 through the surface coupler 25. The rigid rod 29 is a metal stem in contact with the exterior surface 42 of the conduit 20 through the surface coupler 25. The rod 29 has a second end 32 acoustically coupled to a diaphragm amplifier 33. The diaphragm amplifier 33 is housed in a first end 34 of an acoustic chamber 35. A second end 36 of the acoustic chamber 35 forms the acoustic output 24. The acoustic chamber 34 acoustically couples between the diaphragm and the microphone 22. The diaphragm 33 is restrained at its periphery 38 by the amplifier housing 21 and transmits amplified acoustic energy to the acoustic chamber 37. The rod 29 oscillates the diaphragm 33 and amplifies the acoustic energy as sound waves transmitted up the rod 29. The magnet 41, rod 29, and diaphragm 33 are mass balanced between the rod 29 and diaphragm 33 to optimize oscillations.

Figure 3:
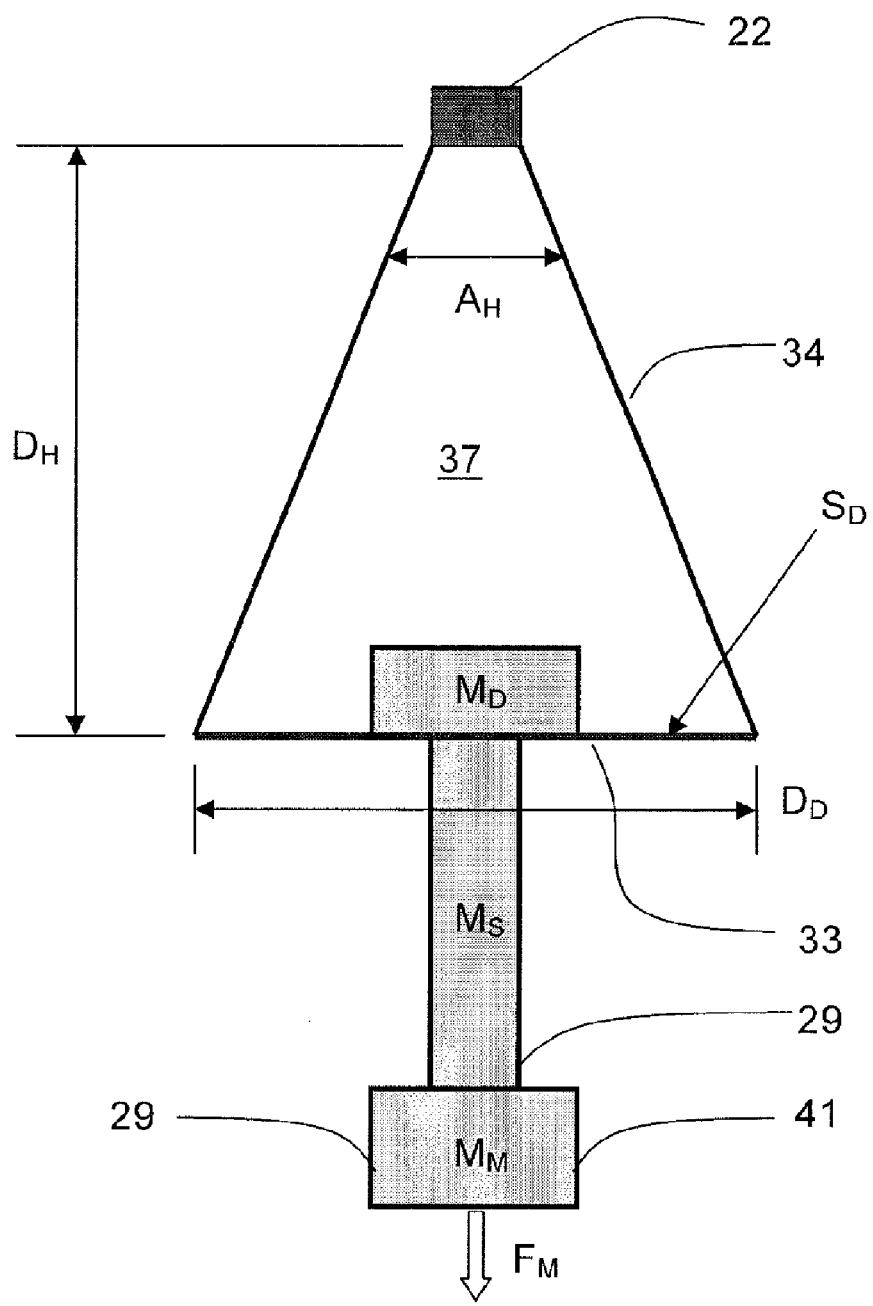
FIG. 3 is a schematic of an optimized mechanical amplifier and microphone.

As shown in FIG. 3, the transmission of acoustic energy is optimized through balancing of mass of the various components. In FIG. 3, tunable parameters regarding of the acoustic housing are set forth as follows: angle of the acoustic chamber $A_H$, the Depth of the acoustic chamber $D_H$, the diameter of the diaphragm $D_D$, the stiffness of the diaphragm $S_D$, Mass of the diaphragm $M_D$, Mass of the stem or rod $M_S$, mass of the magnet $M_M$, and the attractive force of the magnet $F_M$. Preferably the mass ($M_D$) at the diaphragm 33 about two times greater than the mass ($M_M$) at the magnet 41.

The acoustic housing 34 forms an acoustic wave guide 37 to concentrate the sound waves from the diaphragm 33 to the microphone 22. A shown, one form of acoustic chamber is a first truncated conical shape with a wide base at the diaphragm 33 and narrowing to a narrow base of a second conical shape further narrowing to the acoustic output 36 at an apex. Typically the microphone 22 is selected to be suitable for outdoor use.

The microphone 22 is situate at the second end 36 to receive amplified acoustic energy from the diaphragm amplifier 33. The microphone 22 produces first signals related to the acoustic energy in the pipe. The microphone 22 is electrically coupled through a cable or wires 12 extending out of the housing 30 for conducting the first signals to the control circuit 13.

Outer Housing

As shown in FIGS. 1B and 2, the housing outer 30 can be mounted to the surface 42 to properly position the sensor 11 in contact therewith. The housing 30 can be fit with means for mounting such as a flange 40 for affixing the acoustic sensor 11 at a non-invasive location along the conduit 20. The flange forms a port 43 therethrough for permitting mounting of the outer housing 30 to the conduit 20 with the acoustic coupler 25 or input 22 to extend from the outer housing for coupling with the conduit 20.

As shown in FIG. 1, U-bolts can be used to secure the flange 40 to the conduit 20. Other forms of connection such as clamps, blocks, clips, straps, buckles, and the like can be used. The means for mounting is sufficient to retain the outer housing 30 to the conduit while minimizing attenuation of the surface.

The outer enclosure or protective housing 30 is a support for the acoustic housing 21 which enables substantially frictionless movement of the acoustic housing along an axis of the rod 29. Lateral support 50 is provided in an annulus 51 between the acoustic housing 21 and protective housing 30 without impeding the axial movement. The lateral support can be resilient such as foam supported from a more rigid structure such as radial gussets 53 extending inwardly to the acoustic housing 21 from the outer housing 30. This lateral support 50 minimizes friction and allows the magnet 41 to maintain constant axial attachment force to the conduit.

As shown, the cable or electrical wires 12 are arranged to minimize transmission of mechanical forces which would interfere with the free axial movement of the acoustic housing 21. The protecting housing 30 can include sound attenuation material to minimize ambient background noise. The entry of the wires 12 through the housing 30 is waterproof connection.

The protective housing 30 and means for securing same to the conduit 20 can be simple, such as that shown in FIGS. 1A, 1B where the conduit diameter is consistent or known in advance.

Further mounting embodiments are illustrated in FIG. 4.

With reference to FIGS. 4A, 4B, 4C, and 4D, for more universal adaptation to a pre-determined group of pipe or conduit sizes can be advantageously provided. For example, as shown, various inserts 55 for a pinch clamp 56 can be provided which accept standardized conduit or pipe sizes including a size range of about 1"-3" as shown in FIGS. 4B-4D respectively. The variable sized inserts 55 enable use of a lesser number of fixed size outer shells of a pinch clamp 56 while enabling adapting to varying pipe sizes and maintaining waterproof seal. A quick and simple clamp or bolting arrangement can retain the insert halves in the outer shell. The interface of the protective housing 30 to the conduit wall 42 has a waterproof face sealing (not shown) to the conduit 20.

Each insert is provided with a cavity 57 to enable recessed positioning of the acoustic sensor 11 within the insert and in contact with the conduit. In each case, as shown in FIG. 4A using the insert of FIG. 4B, the acoustic amplifier 11 is positioned so that the magnet surface coupling 24 is positioned for free axial movement with the conduit wall 42.

Control Circuit

With reference to FIGS. 1 and 5, the electrical wires 12 can lead out of an intrinsically safe zone to the control circuit 13 where some or all of the processing is performed. A simple user interface can be provided to assure the user that the acoustic sensor 11 and control circuit 13 are monitoring flow and transmitting data. A light emitting diode (LED) on the outside of processor enclosure indicates measurement cycle, mode of transmission (such as 1, 2, 4 times per day). The user can change transmission mode without opening enclosure (using a magnet and reed switch).

The on-site components of the control circuit 13 operate with a low power requirement for extending their life between service requirements and providing an intrinsically safe operation capable of operation in hazardous environments.

The first signal from the microphone 22 is conducted outside the intrinsic zone, typically 10-15 feet away, where the control circuit 13 provides an excitation voltage and current to microphone. Preferably the microphone 22 is a condenser type requiring very low power and giving inherent intrinsic safety, without traditional expensive electrical barrier components. An example of a suitable microphone is model # B6050AL442 available from JLI Electronics, (see www.jlielectronics.com). The choice of a condenser type or digital type of microphone 22 lowers overall power consumption (compared to traditional sensors). A digital type of microphone which digitizes the acoustic signal internally at the sensor and transmits the data to the processor digitally can result in a better signal to noise ratio than analog microphones. Further, a digital microphone may enable use of longer length signal runs to the processor.

The microphone 22 must have sufficient inherent sensitivity to measure the very low acoustic energy and either analog and digital systems can be used if they have sufficient sensitivity and have low power consumption. If the microphone is used in hazardous environments, the digital or analog microphone would be intrinsically safe.

With reference to FIGS. 1A and 5, part of this circuit 13 includes the signal amplifier 14. Even through audio frequencies are polled, a radio frequency (RF) band rather than audio band amplifier is employed. Audio band amplifiers consume more power. Use of an RF amplifier again aids in lowering power consumption (low frequency accuracy is not critical). Where flow rates determination is not critical, such as in trending, or change of condition detection, the accuracy need not be very high. Typical frequencies are in the range of about 1 Hz to about 15 kHz. An example of a suitable RF amplifier is model # AD8515 available from Analog Devices, Inc. (see www.analog.com).

Once amplified, a Delta-Sigma style digitizer 15 is used to perform alias-free acquisition in the audio band without the usual requirement for separate analog filter components. Again, this choice results in lower power requirements and smaller overall component size. An example of a suitable digitizer is model # AD7729 also available from Analog Devices, Inc.

Signal processing 16 including a first microprocessor 16a, having extremely low power consumption such as the PIC12F from Microchip Corporation (See www.microchip.com) provides various power management functions including: watchdog triggering of a power circuit for periodic and momentary activation and monitoring of the microphone and digitization circuits, and preferably also measuring and reporting of the condition of the battery 19 for reliability, and measuring ambient temperature and use for compensation.

Signal processing 16 further comprises processing of the digitized signal which can be directed to a second microprocessor 16b such as the Model AT91FR40162, a 32 bit ARM 7 microcontroller from Atmel Inc. for signal processing which can include spectral analysis used to eliminate energy which is caused by background ambient noise rather than fluid flow. Analysis includes removal of signals where: the amplitude is too high, the duration is too short and the spectral pattern does not match an expected flow regime.

The signal 12 is digitized by the A to D converter 15, which generates a digital representation of the acoustic signal we call the time domain signal. The time domain signal then has a windowing function applied (such as Hanning or Hamming) to reduce the effect of discrete time sampling in the signal. A transform (such as Fast Fourier transform) is then applied to convert the signal to the frequency domain. Several (typically 30 to 60) individual frequency spectrums are averaged together which further improves the signal to noise ratio, and the result of this step is referred to as the frequency domain signal. The frequency domain signal contains the total amount of acoustic energy measured by the sensor, divided into uniform frequency components usually referred to as bins. Selected frequency components (bins) are excluded from further analysis, having been found to represent background ambient acoustic energy, and selected bins are retained for further analysis, this acoustic energy being related to flow of gas in the conduit. The energy from the selected retained frequency bins is then summed, and this sum has been found to correlate directly with the differential pressure, as demonstrated In another embodiment, a hybrid processor, such as Analog Device's, Blackfin Model BF537, available from Analog Devices, Inc. http://www.analog.com/processors/processors/blackfin/ can provide both power management microcontroller 16a and digital signal processing 16b coupled with lower total power consumption, a single hardware device and programming environment for all functions, including power management and less communication between processors.

In an example of a management scheme, periodic sound sampling is done and data is accumulated over a time; say for about one week. Thus expectations can be made of the next period. A variety of numerical processing techniques including moving averages can be used. A moving average and like methodologies aid both in using historical data to control and manage both the frequency of power-consuming data collection, logging and determining of various alarm status.

As stated above, typically the sum of the spectral energy from the processed data represents the amount of flow in the pipe or conduit. Flow data is accumulated over a period of time to report the gas flow at the specific location. For example, readings for flow rate every minute are stored on the processor for 10 to 30 days. The processor learns the normal statistical model for the flow for the installation.

The acoustic data can be analysed by summing the energy in specific frequency bands which best represent the flow energy. One then totalizes the spectral energy for specific intervals which is logged and stored to non-volatile memory. Thus, rather than forwarding massive amounts of raw acoustic data, a simple numerical value as a data point representing the flow regime can be provided periodically.

The data representing flow conditions is compared to historical logged patterns. Both a quantitative value can result, such as an acoustic energy value which corresponds to flow rate, and as well, a qualitative result or event triggering, such as rate of change, variation beyond a threshold, or system status reports such as power and memory status.

Alarms for changes in flow rate can be generated at the device including low flow, high flow, slope exceeding a threshold, and increasing roughness.

For example, an alarm can be generated when: a current flow rate is below a lower limit threshold, an integrated flow level is below historical level by threshold amount, a flow rate is trending downward towards lower limit, a roughness of flow has increased beyond threshold amount, and processing memory is full or battery power low.

Once determined, values or signals such as flow rate and alarm information are communicated to means for analysis, typically remote from the location of the conduit. Preferably an extremely low power satellite transceiver is used, such as that used in GPS tracking systems for the vehicle and transportation industry. One suitable transceiver is a Globalstar Simplex Transmitter Unit (STU) available from Globalstar, Inc. (See http://www.globalstarusa.com). The STU is a low cost, simplex device that allows packet-switched data to be sent automatically, on a time or event driven basis, from remote locations.

It is preferable to use satellite rather than radio or cell phone transmission as the devices consume less power, the same device can work anywhere in the world, and it does not require expensive site path surveys, communication towers or infrastructure.

The processed signals or data set can be digitally packed or compressed to allow for increased information to be transmitted in a compact and fixed message size. To pack more the data into a small message format, readings are encoded and data bits are packed. Status bits are used to indicate device status, flow status, alarms. As a result, 12 hourly flow readings and all status content can be transmitted in only about 36 bytes of message.

At the remote location, the transmitted data is received at a central computer and spectral energy data is converted to flow units, according to user configuration. Equipment function and operational compliance can be determined and reported. Data can be reported from the computer to other devices such as through electronic communication, laptop computers and PDA devices. Use of this remote processing avoids field configuration including eliminating on-site user interfaces and processing with savings in cost and power consumption.

EXAMPLES

With reference to FIGS. 6, 7A, 7B and 8, the output of an embodiment of the sensor above was compared against conventional flow measurement techniques. It is well known that flow rate of gas in conduits can be inferred by measuring the differential pressure drop across a known restriction, such as an orifice in a plate. Using a sensor, monitoring electronics, and signal processing techniques, it was shown that the acoustic energy directly correlates very well to the differential pressure across the orifice plate, and thus the acoustic energy correlates with the flow rate of the gas.

Figure 6:
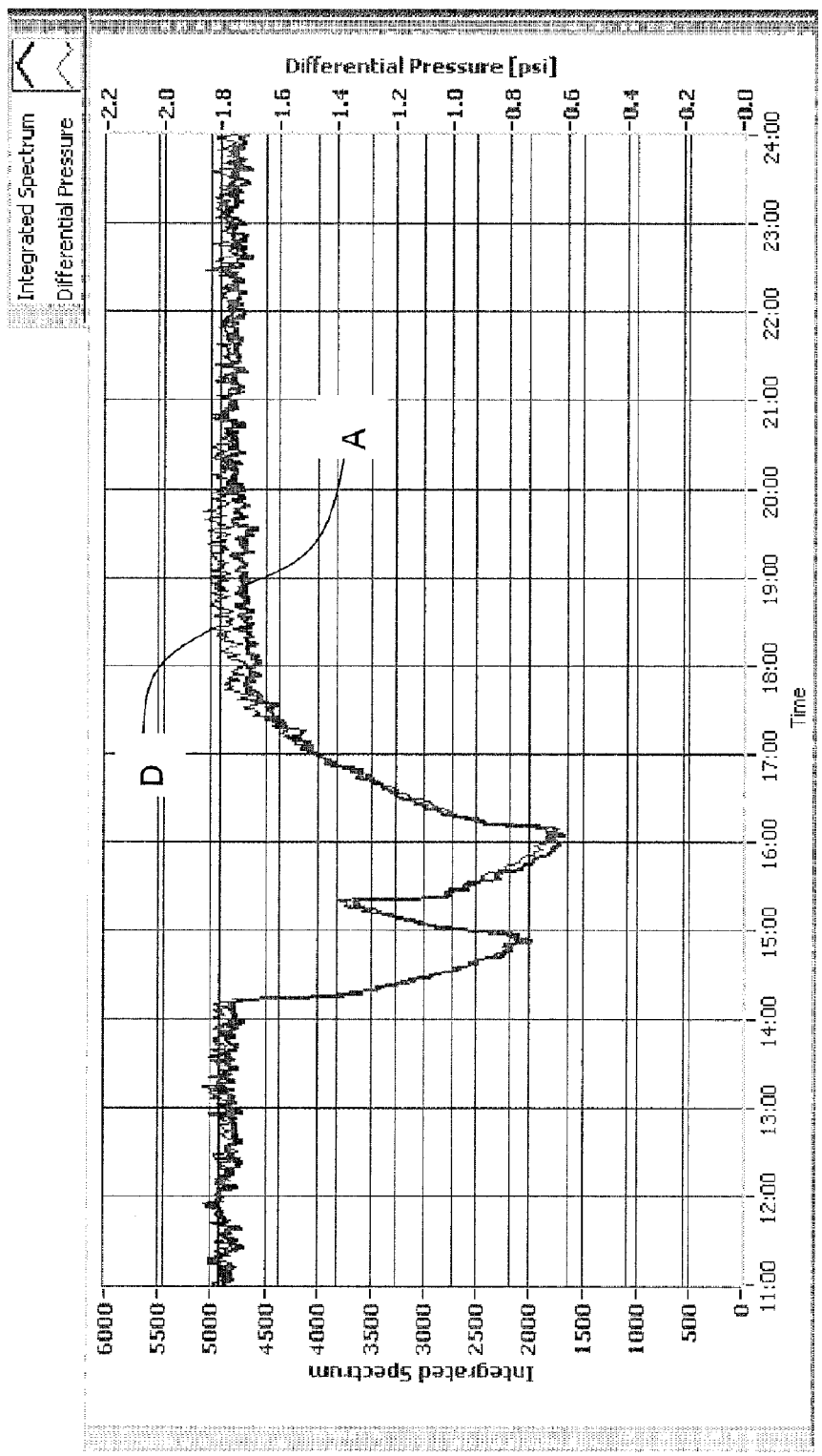
FIG. 6 is a graph of acoustic energy established using an embodiment of the invention as compared against conventional flow measurements in a 2 inch pipe.
Figure 7A:
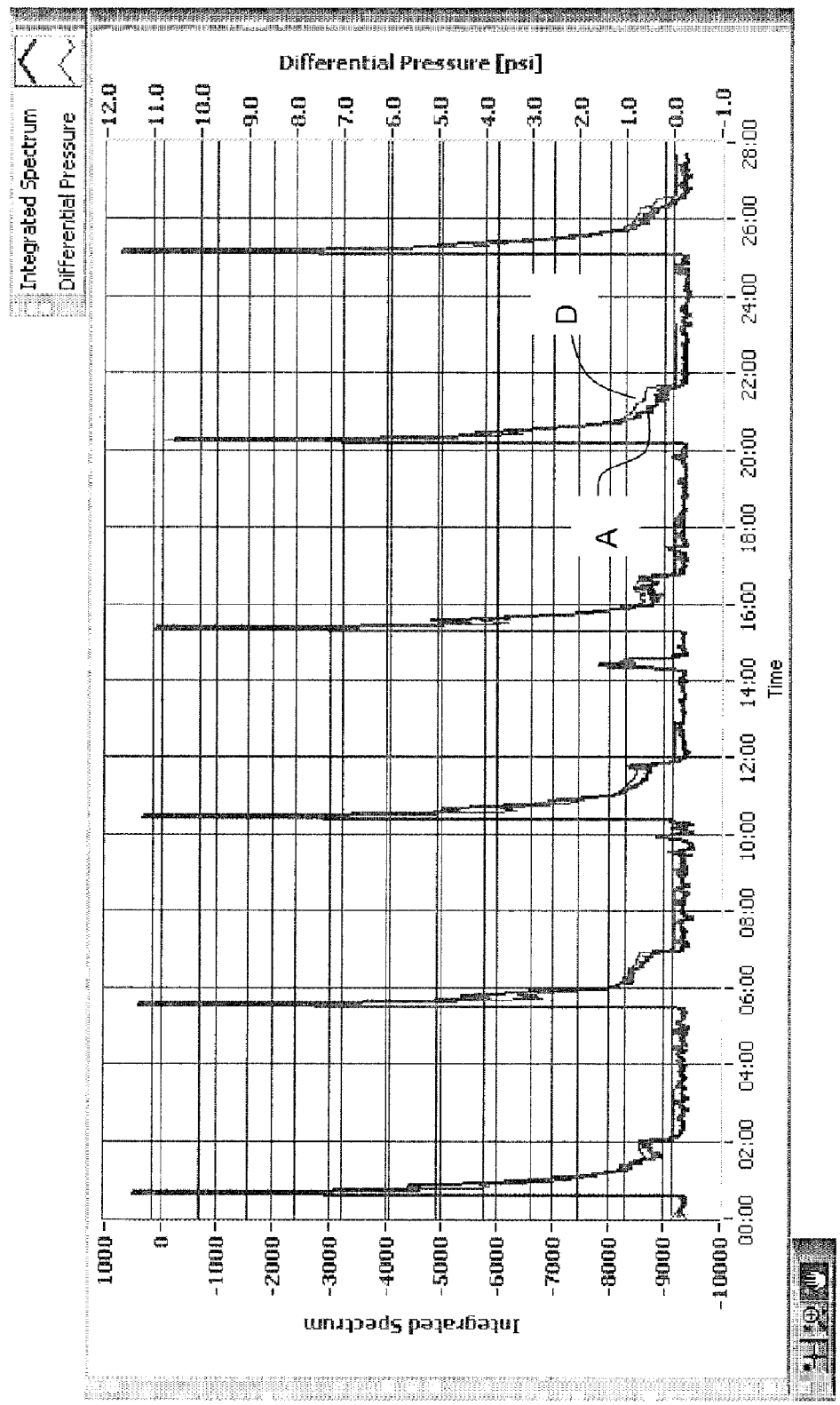
FIG. 7A is a graph of acoustic energy compared to conventional flow measurements in a 3 inch pipe.
Figure 7B:
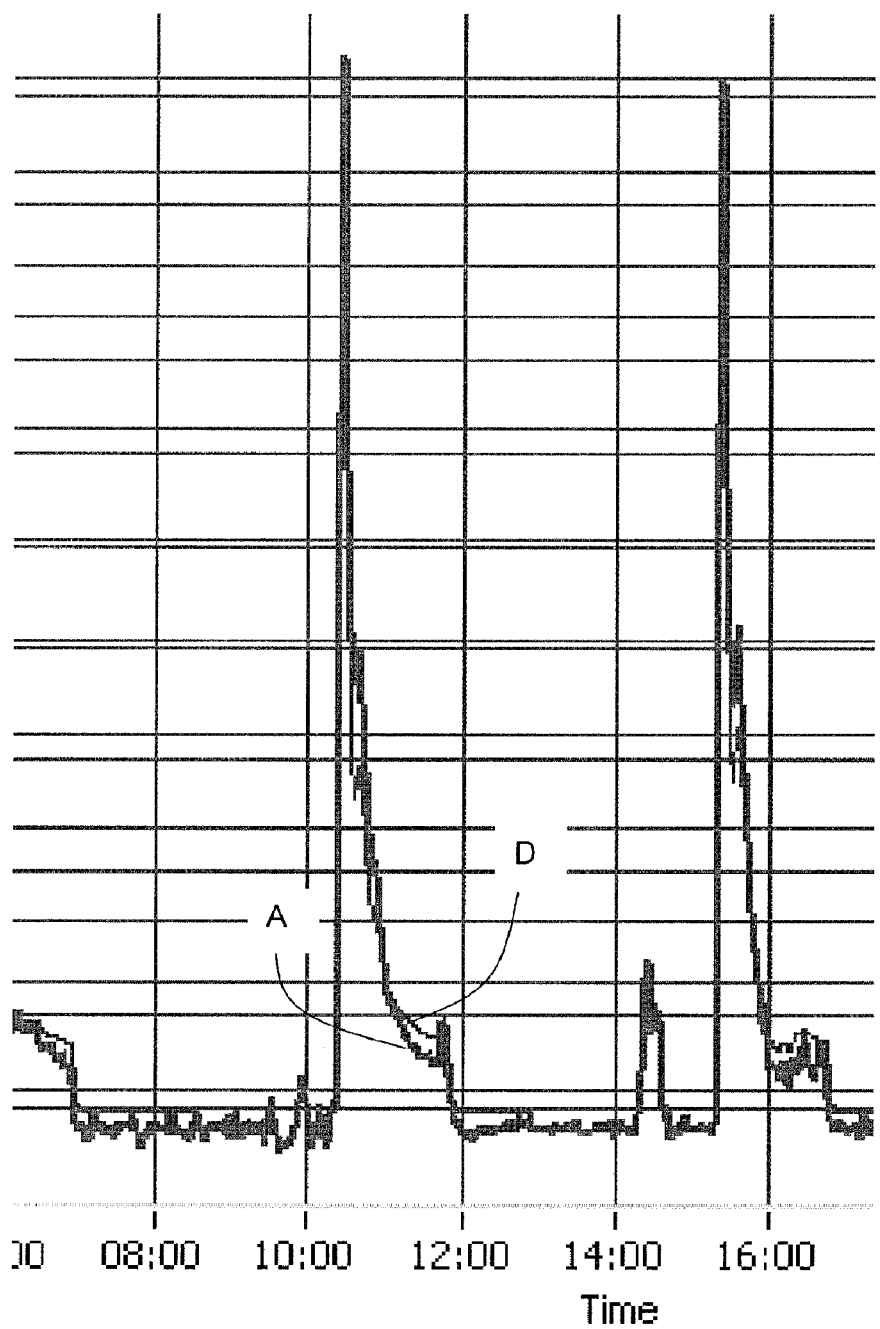
FIG. 7B is a close up extracted portion of FIG. 7A to illustrate the comparative traces.
Figure 8:
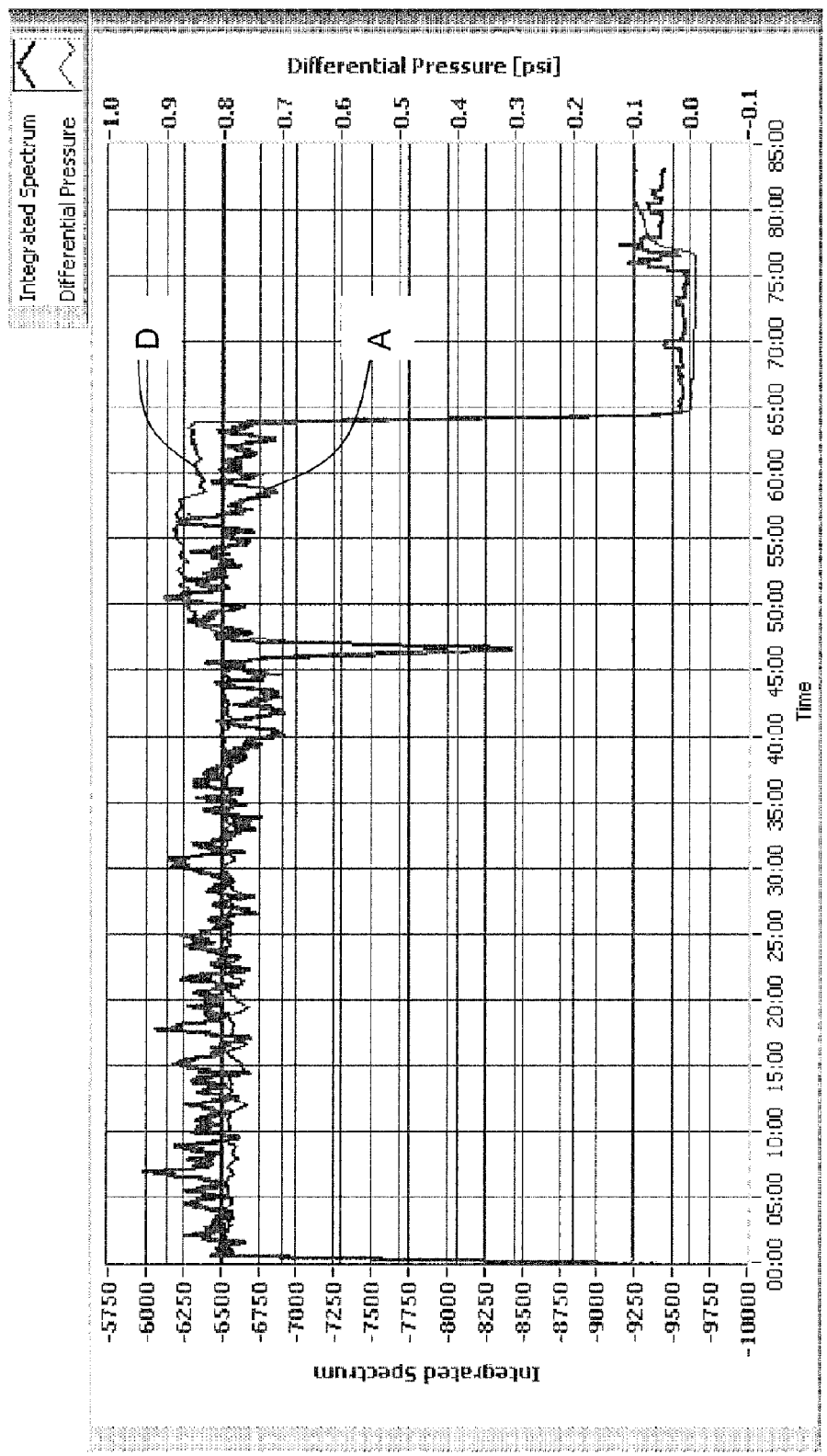
FIG. 8 is a graph of acoustic energy compared to conventional flow measurements in a 4 inch pipe.

As shown in the comparative acoustic and convention differential pressure analysis of FIGS. 6-8, acoustic energy correlates well to differential pressure, which correlates to flow rate by well known square root calculation.

Testing of acoustically-determined flow rates were measured in conduits such as standard piping from 1.5" diameter to 12" diameter. The orientation of the pipes, whether horizontal, vertical or sloped did not affect the correlation. Further, the spacing of pipe supports was determined to be insignificant. Turbulence in the flow which is induced by a test orifice plate is helpful in generating higher acoustic energy, but not required. Good results were also obtained in other piping configurations including straight runs of pipe, pipe with elbows, and transitions in pipe size.

In addition, the circumferential location of the sensor on the pipe did not affect the performance. While a normal location vertically atop the pipe can have weatherproofing and maintenance advantages, various other locations around the pipe did not affect acoustic energy measurements.

As follows, examples are provided for pipes 2 inches to 4 inches in diameter. Each example used the same arrangement of sensor 11

With reference to FIG. 6, this example shows flow in a 2" pipe and compares acoustic energy A and differential pressure D measured across a 0.625" orifice plate. The nominal flow rate was approximately 78,000 cubic feet per day. The acoustic energy A tracked the differential pressure D throughout various flow regimes.

With reference to FIG. 7A, this example shows flow in a 3" pipe for a gas well operating with a plunger lift system having cyclic and periodic gas flow periods while parasitic liquid collects and slowly retards gas production, followed by a liquid unloading period and then resumption of gas production. Differential pressure measured across a 1.00" orifice plate. As shown, and also shown in more detail in the close up view in FIG. 7B, the comparison of acoustic energy A and differential pressure D shows excellent correlation of acoustic data even when flow rate changes abruptly. Nominal flow rate is approximately 140,000 cubic feet per day.

With reference to FIG. 8, this final example shows good correlation of acoustic energy and flow measured by differential pressure D in a 4" pipe with the differential pressure measured across a 1.25" orifice plate. Nominal flow rate is approximately 700,000 cubic feet per day.

The acoustic energy A can be measured across a variety of flow rates and pipe sizes. There were no cases found where the acoustic energy was too great for existing system and thus no clipping of the signal was experienced.

What is claimed is:

1. Non-intrusive apparatus for measuring parameters related to fluid flow in a conduit comprising:
    an acoustic coupler located along the conduit and adapted for contact with the conduit;
    a mechanical amplifier having an acoustic input coupled to the acoustic coupler and having an acoustic output;
    an analog microphone coupled to the acoustic output and establishing first signals related to acoustic energy in the conduit; and
    a signal processor for receiving the first signals and comprising:
        an analog amplifier for amplifying the first signals;
        a digitizer for digitizing the first signals and generating a raw data stream;
        and
        at least a data processor for processing the raw data stream and generating second signals indicative of fluid flow in the conduit.

2. The apparatus of claim 1 wherein the analog amplifier for amplifying the first signals is a radio frequency amplifier.

3. The apparatus of claim 2 wherein the first signals has a frequency in the range of about 1 Hz to about 15 kHz.

4. The apparatus of claim 2 wherein the digitizer is a delta-sigma style digitizer.

5. The apparatus of claim 4 wherein the signal processor further comprises a watchdog trigger for periodic and momentary activation and monitoring of the microphone and signal processing.

6. The apparatus of claim 5 wherein the signal processor further comprises a power management processor for managing the watchdog trigger.

7. The apparatus of claim 1 wherein the second signals include qualitative data.

8. The apparatus of claim 1 wherein the second signals are wirelessy transmitted to a remote location.

9. The apparatus of claim 8 wherein the second signals are digitally packed before being wirelessy transmitted.

10. The apparatus of claim 1 further comprising:
    an outer housing for housing a sensor comprising the acoustic coupler, the mechanical amplifier and the analog microphone; and
    means for mounting the outer housing along the conduit with the acoustic coupler adjacent the conduit for contact therewith.

11. The apparatus of claim 10 wherein the outer housing further comprises:
    an outer shell for enveloping the sensor and having an open end through which the acoustic coupler extends;
    a seal between the outer housing and the surface; and
    lateral supports extending inwardly from the outer shell for guiding the sensor while permitting substantially frictionless movement of the acoustic input through the open end.

12. The apparatus of claim 11 wherein the outer housing further comprises a flange connected to the outer shell for mounting to the conduit.

13. The apparatus of claim 1 wherein the acoustic coupler is adapted to adhere to a surface of the conduit.

14. The apparatus of claim 13 wherein the surface of the conduit is magnetically attractable further comprising: the acoustic coupler is a magnet for magnetically adhering to the surface of the conduit.

15. The apparatus of claim 1 wherein the mechanical amplifier comprises:
    an amplifier housing having an inlet end and an outlet end, the acoustic input being located at the inlet end and the analog microphone being located at the outlet end; and
    a diaphragm intermediate the acoustic input and the acoustic output, wherein
        the diaphragm is acoustically coupled to the acoustic input, and
        the acoustic output is acoustically coupled to the analog microphone.

16. The apparatus of claim 15 wherein the amplifier housing further comprises an acoustic chamber between the diaphragm and the analog microphone.

17. The apparatus of claim 16 wherein the mechanical amplifier further comprises a rod extending between the diaphragm and the acoustic coupler.

\* \* \* \* \*